(12) United States Patent
Friend et al.

(10) Patent No.: US 6,671,933 B1
(45) Date of Patent: *Jan. 6, 2004

(54) SAFETY COUPLER WITH RELEASE MECHANISM

(76) Inventors: Roxane Friend, 11555 W. Grand River Ave., Lowell, MI (US) 49331; James R. Friend, 11555 W. Grand River Ave., Lowell, MI (US) 49331

( * ) Notice: Subject to any disclaimer, the term of this patent is extended or adjusted under 35 U.S.C. 154(b) by 0 days.

This patent is subject to a terminal disclaimer.

(21) Appl. No.: 10/134,217

(22) Filed: Apr. 29, 2002

(51) Int. Cl.[7] .......................... A44B 21/00; F16B 45/00; F16B 45/04
(52) U.S. Cl. ...................... 24/265 H; 24/115 F; 24/602
(58) Field of Search .................... 24/3.4, 3.6, 115 F, 24/265 H, 602, 369–378.1, 298–302, 598.1–601.9; 403/2; 59/95; 119/776, 795

(56) References Cited

U.S. PATENT DOCUMENTS

| | | | | |
|---|---|---|---|---|
| 2,733,042 A | * | 1/1956 | Culbertson | 251/75 |
| 3,439,387 A | * | 4/1969 | Churches | 24/300 |
| 3,825,092 A | * | 7/1974 | Graydon et al. | 180/272 |
| 4,125,958 A | * | 11/1978 | Cote | 43/43.12 |
| 4,304,403 A | * | 12/1981 | Wilson | 473/502 |
| 4,687,365 A | * | 8/1987 | Promersberger | 403/2 |
| 4,733,625 A | * | 3/1988 | Allen | 403/289 |
| 4,742,605 A | * | 5/1988 | Ritacco | 24/602 |
| 5,027,477 A | * | 7/1991 | Seron | 24/3.4 |
| 5,174,246 A | * | 12/1992 | Driver | 119/795 |
| 5,548,875 A | * | 8/1996 | Hart et al. | 24/265 H |
| 6,286,190 B1 | * | 9/2001 | Friend et al. | 24/265 H |
| 6,457,896 B1 | * | 10/2002 | deDoes | 403/2 |

* cited by examiner

Primary Examiner—J. J. Swann
Assistant Examiner—Ruth C. Rodriguez
(74) Attorney, Agent, or Firm—Van Dyke, Gardner, Linn & Burkhart, LLP

(57) ABSTRACT

A safety coupler includes a ring member, a hook member, and an annular member. The hook member includes a rod portion and a hook, with the rod portion including a pin and a pair of stops. The pin extends through a transverse opening provided in the ring member. The rod portion includes a releasable connection whereby the hook member and the second member decouple when a force having a selected magnitude is applied to one of the ring member and the hook member along the axis.

19 Claims, 2 Drawing Sheets

SAFETY COUPLER WITH RELEASE MECHANISM

TECHNICAL FIELD AND BACKGROUND OF THE INVENTION

The present invention relates to a safety coupler and, more particularly to a safety coupler, that is especially suited for situations in which a quick release would be desirable, such as when connecting straps or the like to an animal halter or bridle for tying the animal to a post, equipment, including a trailer, or the like.

When tying down large animals, such as a horse, the animal is typically placed in a halter with one or more ropes or straps secured to the halter on one end and secured on another end to a fixed structure, such as a post, including a barn post, a fence, a trailer, or the like. Each rope is typically secured to the halter using a coupler or snap. Conventional snaps include a ring member through which the strap or rope extends and a hook member which is rotatably mounted to the ring member and which secures to the halter of the animal. The hook member is rotatably mounted to the ring member to permit the rope or strap to rotate freely with respect to the halter. Most snaps include a latch mechanism of some sort, which closes the hook member on the halter. Thus, snaps provide a quick way to secure the rope or strap to the halter.

When tied, cross-tied, or trailer tied, large animals, and most notably horses, are easily spooked. It could be as simple as someone walking by or the sound of something falling that could trigger the animal into a panic. Once spooked, these larger animals pull on the rope or strap tying them down. As the animal feels more resistance in the rope, the animal tends to pull harder eventually breaking either the halter, snap, rope, or the structure to which the rope is tied, thus exposing the animal, the structure, and any persons in the vicinity of the animal to risk of damage or injury. Further, when the animal finally breaks free the risk of flight is quite high. In contrast, when the tension on the rope is quickly released, a spooked animal will often quickly calm down and is far less likely to run off.

Historically, snaps have not provided a quick way to release a strap or a rope from an animal when the animal is panicked or excited. Recently, as described in U.S. Pat. No. 6,286,190, which is incorporated by reference in its entirety, safety couplers have been designed to incorporate a release mechanism so that the hook member can release from the ring member through the pivot opening in the ring member when a preselected force is applied to either the hook or the ring member without breaking either member and, further, in a manner to permit the hook member to be reinserted into the pivot opening of the ring member. While facilitating repeated use of the coupler, the components providing the release mechanism are not as durable as the components forming the hook or ring members, which are typically brass.

Consequently, there is a need for a coupler or snap that can securely couple a strap or rope to a halter of an animal or the like so that the animal can be tied off and yet provide a quick release in the event that the animal tries to break free before the animal becomes too panicked or the halter, strap, or rope or structure is stressed to the point of failure. Furthermore, it is desirable that the coupler comprise components that are as durable as conventional non-releasable snaps or couplers.

SUMMARY OF THE INVENTION

Accordingly, the present invention provides a safety coupler that includes a release mechanism, which provides a quick release between two components of a swivel coupler or snap.

In one form of the invention, a safety coupler includes a first member, which forms a closed loop for coupling to a first item, and a second member that includes a hook and is coupled to the first member. The second member is rotatably mounted to the first member in a transverse opening provided through a portion of the first member so that the hook can swivel about the first member. The hook is provided for coupling to a second item whereby the first item is coupled to the second item by the safety coupler. The second member includes a releasable connection such that when a force having a selected magnitude is applied to one of the first and second members generally along the hook's axis of rotation, the first member and the second member decouple thereby decoupling the first and second items.

In one aspect, the second member includes a pin and first and second stops. The pin extends through the transverse opening of the first member with the first and second stops being positioned on opposite sides of the transverse opening for abutting the first member to limit axial movement of the pin through the first opening.

In further aspects, the second member includes an end portion and a base portion, with the end portion rotatably coupling the second member to the first member. The releasable connection is provided between the end portion and the base portion. For example, the end portion may include the pin and first and second stops, with the pin rotatably coupled to the first member in the transverse opening and being axially restrained in the transverse opening by the stops. Furthermore, the end portion may include a socket, with the base portion including a pin, with the pin releasably journaled in the socket and forming the releasable connection. In a further aspect, the pin of the base portion includes a groove, which cooperates and releasably engages a groove in the socket to thereby releasably couple the pin in the socket.

According to another aspect of the invention, the safety coupler includes a first member and a second member as noted above. The second member includes a rod portion, a hook portion, and an end portion which comprises a pin and a pair of stops. The pin extends through the transverse opening of the first member and rotatably couples the rod portion and the hook portion to the first member about an axis so that the hook portion can swivel with respect to the first member. The stops axially restrain the pin in the transverse opening of the first member. The hook portion is for coupling to a second item whereby the first item is coupled to the second item by the safety coupler. The end portion of the second member releases from the rod portion when a force having a pre-selected magnitude is applied to either the first member or the second member along the axis thereby uncoupling the two items.

In one aspect, the end portion includes a snap-fit connection with a rod portion to form a releasable connection between the end portion and the rod portion. For example, the end portion may include a socket, with the rod portion including a pin, which is releasably mounted in the socket to thereby releasably couple the end portion to the rod portion.

These and other objects and features will become more apparent from the study of the drawings in connection with the description of the preferred embodiments which follow.

DETAILED DESCRIPTION OF THE PREFERRED EMBODIMENTS

Figure 1:
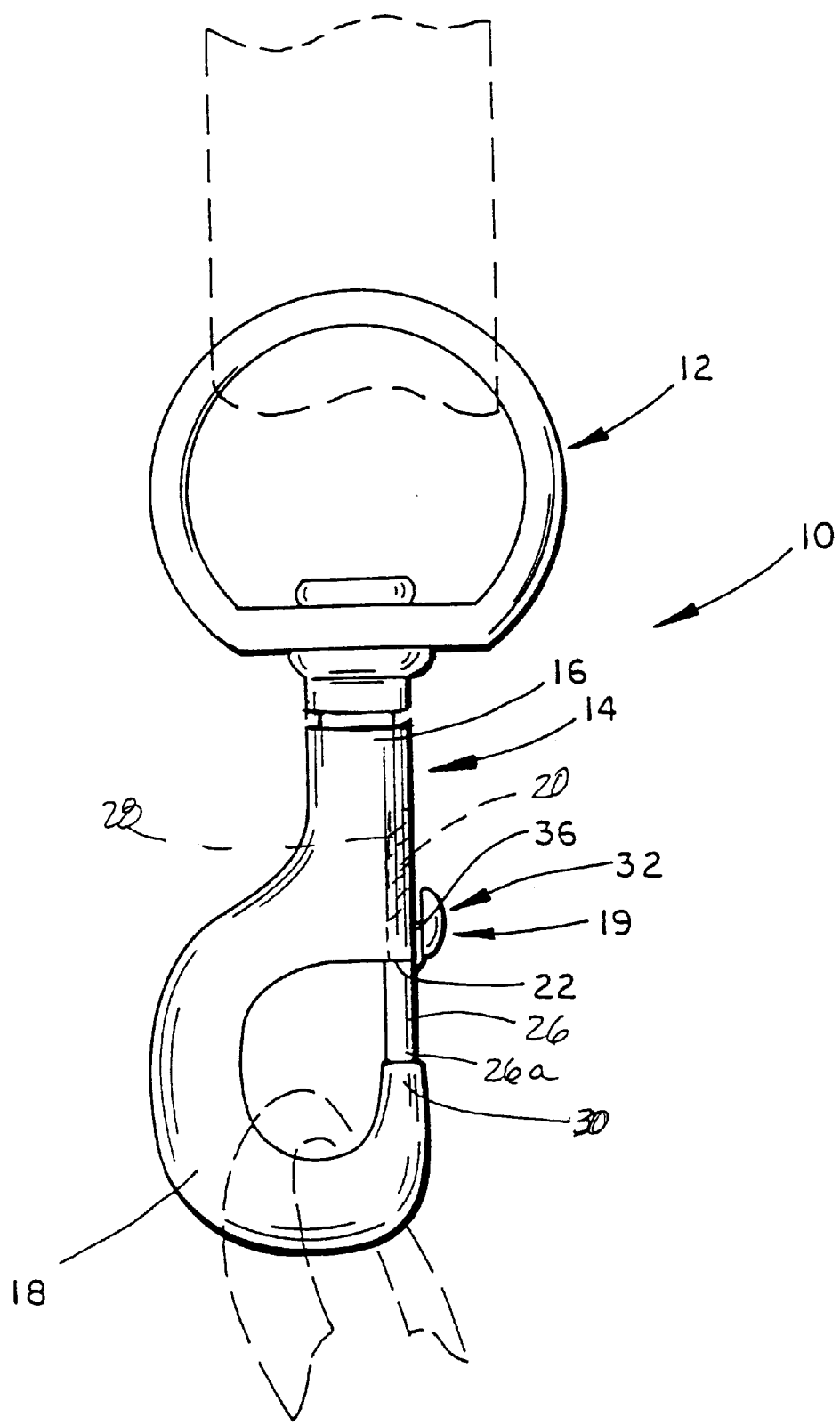
FIG. 1 illustrates a safety coupler of the present invention.

Referring to FIG. 1, the numeral 10 generally designates a safety coupler of the present invention. Safety coupler 10 may be used to couple a rope or strap or the like to an item, for example an animal halter or bridle. Safety coupler 10 is especially suitable for use in tying-off an animal, such as a horse, a cow, an oxen, a mule, donkey or other large animals, when grooming the animal or just for securing the animal.

As best seen in FIG. 1, safety coupler 10 includes a metal ring member 12, such as a brass or stainless steel ring, and a metal hook member 14, for example, a brass or stainless steel hook, which is rotatably and releasably mounted to ring member 12, as will be more fully described below. Preferably, ring members 12 and hook member 14 are cast from brass. A rope or strap may be extended through the ring member, while the hook member is used for securing the rope or strap to the halter or bridle. It should be understood that ring member 12 and hook member 14 may be formed from other durable materials, including graphite, mineral filled plastics, or the like.

In the illustrated embodiment, hook member 14 includes a rod or elongate portion 16, a C-shaped hook 18, and a closure or latch mechanism 19. Latch mechanism 19 includes a movable latch member or pin 26 and a biasing member 28. Rod portion 16 includes a transverse longitudinal passageway 20 which extends from a lower end 22 to an upper portion of rod member 16. Slidably positioned in passageway 20 is latch member or pin 26. Latch pin 26 moves in passageway 20 between a closed position in which its end 26a abuts the upturned (as viewed in FIG. 1) end 30 of hook 18 and an open position (not shown) in which latch pin 26 is preferably fully retracted into passageway 20 to thereby open hook 18. Also positioned in passageway 20 is biasing member 28, for example a coil spring, which urges latch pin 26 to its extended, closed position such that distal end 26a of latch pin 26 rests on upwardly turned portion 30 of C-shaped hook 18 thereby closing hook 18. In order to manually retract pin 26 into passageway 20 and open hook 18, pin 26 includes a gripper 32 which projects outwardly from latch pin 26 and is guided along an elongate slot (not shown) provided in rod portion 16, which is in communication with passageway 20.

In the illustrated embodiment, gripping member 32 comprises a bullet-shaped member which is connected to latch pin 26 by a web 36. Preferably, the width of the slot is commensurate in size with web 36 to limit rotation of latch pin 26 in passageway 20, but wide enough to permit web 36 to move up and down in the slot. It should be understood that hook member 14 may include a variety of latch mechanisms, including, for example a biased locking arm as would be understood by those skilled in the art.

Figure 2:
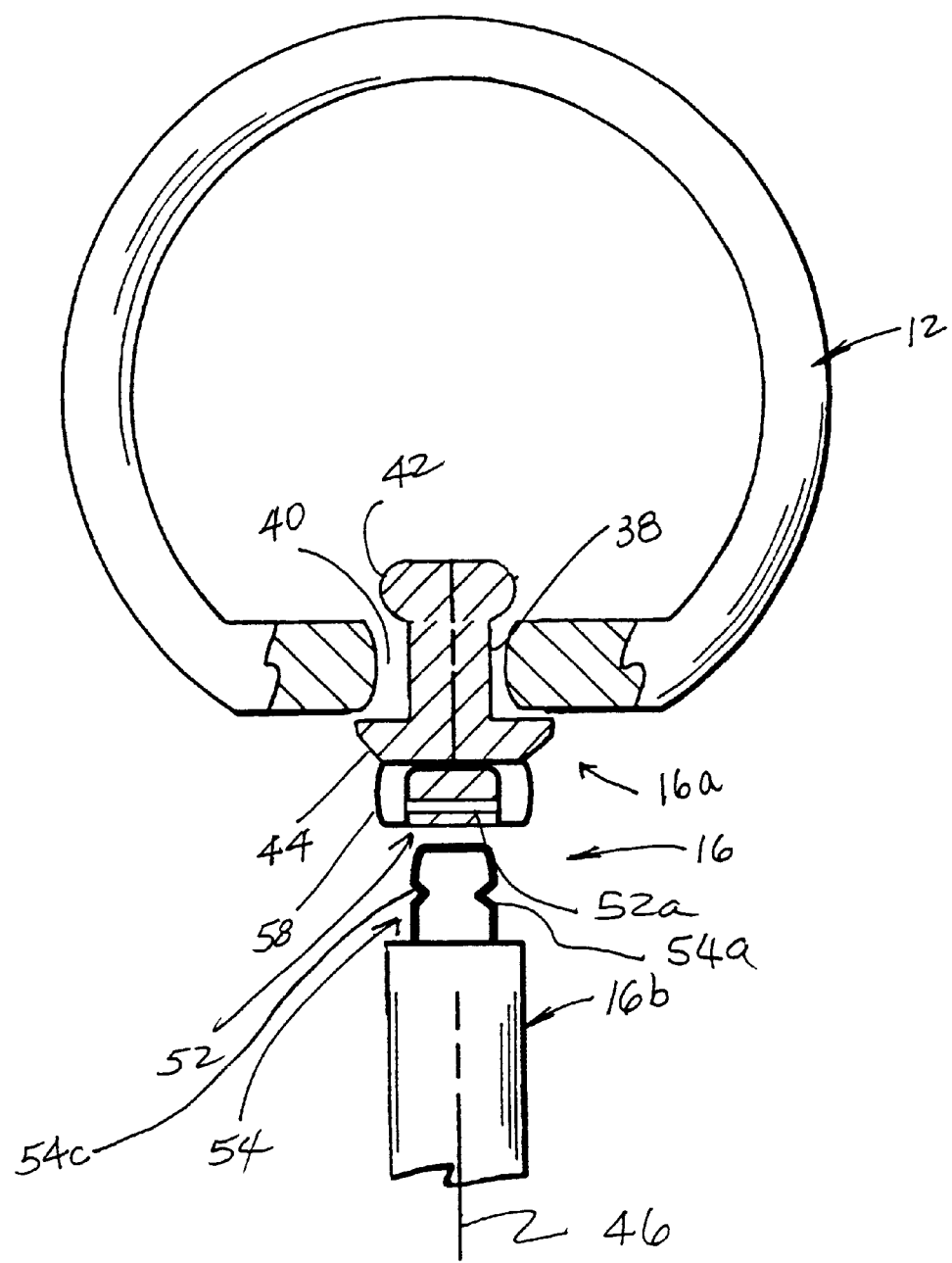
FIG. 2 is a partial fragmentary view of the connection between the hook member and the ring member of the safety coupler of FIG. 1.

Referring to FIG. 2, rod portion 16 includes a releasable connection formed therein between an end portion 16a and a base portion 16b of rod portion 16. End portion 16a includes reduced diameter portion or pin 38 which extends through a transverse opening 40 provided in ring member 12 to thereby rotatably couple rod portion 16 to ring member 12. In this manner, hook portion 14 can swivel with respect to ring member 12. Pin 38 (and rod portion 16) is held in opening 40 by a first stop 42 and a second stop 44, which are respectively positioned on opposite sides of ring member 12. In the illustrated embodiment, stop 42 comprises an enlarged distal end, and stop 44 comprises a shoulder or enlarged annular portion. However, it should be understood that the stops may have other forms than those illustrated in the drawings. Thus, hook member 14 is free to rotate in opening 40 about a longitudinal axis 46 and yet is restrained axially through opening 40 by stops 42 and 44.

End portion 16a further includes a cooperating structure, such as a socket 52. Socket 52 cooperates with a cooperating structure of end portion, such as a reduced diameter pin 54, which projects from base portion 16b and which is journaled in socket 52. Socket 52 may be integrally formed with end portion 16a or may be provided by an annular member or cup 58 that is mounted (optionally releasably mounted) to end portion 16a. For example, cup 58 may be fastened to end portion 16a, including by a compression fit, threads, or by a fastener, or may be integrally formed therewith, for example, by a casting or may be welded thereto. As noted previously, hook member 14 and ring member 12 are preferably formed from a brass material, such as by casting. Cup 58 and pin 54 may be similarly formed from brass. However, cup 58 and pin 54 are preferably formed form steel, including spring steel or the like.

As best seen in FIG. 2, pin 54 includes a groove 54a formed therein which cooperates with a ridge or rib 52a formed on the inner surface of cup 58. Preferably, groove 54a includes at least one tapered side 54c, which forms a cam surface. In this manner, cup 58 forms a releasable, snap-fit connection with pin 54 when ridge 52a engages groove 54a. In this manner, when a sufficient force is applied to either ring member 12 or hook member 14 (along axis 46) of such a magnitude to release ridge 52a from groove 54a, end portion 16a will release from base portion 16b to thereby decouple ring member 12 from hook member 14. By the same token, ring member 12 and hook member 14 may be recoupled by inserting pin 54 into socket 52 so that ridge 52a is engaged with groove 54a. Thus, in addition, to providing a safety release, the releasable connection extends the life of the coupler.

The present invention, therefore, provides a coupler with a safety release so that when the coupler is used, for example on an animal halter or bridle, and the animal panics, the tension from the connecting straps or ropes will be released from the halter so that the animal can quickly calm down. It can be understood, therefore, the selection of the materials of cup 58 and pin 54 and the size of ridge 52a and groove 54a are controlling factors on the magnitude of the force needed to decouple ring member 12 from hook member 14.

Accordingly, a safety coupler for coupling straps, ropes or the like to a halter or bridle, for example, is provided which releases upon an application of a preselected force, for example the force associated with a large animal that is trying to break free. While several forms of the invention have been described, other changes and modifications will be apparent to those skilled in the art. For example, the hook member may include other latch mechanisms for closing the hook on the item to be coupled. Furthermore, the shape of the hook member and the ring member may be varied. In addition, the coupler may be used with animals other than horses, as previously noted. Also, the safety coupler of the present invention may be used in non-animal related applications and is not intended to be limited for use on halters or bridles. Moreover, the locations of the socket and the pin may be reversed. For example, the base portion 16b may include the socket, and the end portion 16a may include pin 54. It should be understood that the embodiments disclosed herein are the preferred embodiments and that the scope of the patent is limited by the claims which follow.

We claim:

1. A safety coupler comprising:
   a first member forming a closed loop for coupling to a first item, said first member having a transverse opening extending through a portion thereof; and a second member having a hook and being coupled to said first member and being rotatably mounted to said first member in said transverse opening about an axis, said hook for coupling to a second item whereby the first item couples to the second item by said safety coupler, said second member further including a releasable connection whereby said first member and said second member release when a force having a selected magnitude is applied to one of said first member and said second member generally along said axis thereby uncoupling the first and second items, and said second member including a latch for closing said hook.

2. This safety coupler according to claim 1, wherein said first member comprises a ring member.

3. The safety coupler according to claim 1, wherein said latch comprises a spring biased latch.

4. The safety coupler according to claim 1, wherein said second member includes a pin and first and second stops, said pin extending through said transverse opening, and said first and second stops being positioned on opposite sides of said transverse opening for abutting said first member to limit axial movement of said pin through said transverse opening.

5. The safety coupler according to claim 4, wherein said first stop comprises an enlarged distal end.

6. The safety coupler according to claim 1, wherein said second member includes an end portion and a base portion, said end portion rotatably coupling said second member to said first member, and said releasable connection being between said end portion and said base portion.

7. The safety coupler according to claim 6, wherein said end portion includes a pin and first and second stops, said pin being rotatably coupled to said first member in said transverse opening and being axially restrained in said transverse opening by first and second stops.

8. A safety coupler comprising:
a first member forming a closed loop for coupling to a first item, said first member having a transverse opening extending through a portion thereof; and
a second member having a rod portion, a hook portion, and an end portion comprising a pin and a pair of stops, said pin extending through said transverse opening and rotatably coupling said rod portion and said hook portion to said first member about an axis, said stops axially restraining said pin in said transverse opening, said hook portion for coupling to a second item whereby the first item is coupled to the second item by said safety coupler, said end portion releasing from said rod portion when a force having a selected magnitude is applied to one of said first member and said second member generally alone said axis thereby uncoupling the first and second items, and said end portion including a snap-fit connection with said rod portion to form a releasable connection between said end portion and said rod portion.

9. The safety coupler according to claim 8, wherein said second member includes a latch for closing said hook.

10. The safety coupler according to claim 9, wherein said latch comprises a spring biased latch.

11. A safety coupler comprising:
a first member forming a closed loop for counting to a first item, said first member having a transverse opening extending through a portion thereof; and
a second member having a hook and being coupled to said first member and being rotatably mounted to said first member in said transverse opening about an axis, said hook for coupling to a second item whereby the first item couples to the second item by said safety coupler, said second member further including a releasable connection whereby said first member and said second member release when a force having a selected magnitude is applied to one of said first member and said second member generally along said axis thereby uncoupling the first and second items, said second member including a pin and first and second stops, said pin extending through said transverse opening, said first and second stops being positioned on opposite sides of said transverse opening for abutting said first member to limit axial movement of said pin through said transverse opening, said transverse stop comprising an enlarged distal end, and said second stop comprises a shoulder formed in said second member.

12. A safety coupler comprising:
a first member forming a closed loop for coupling to a first item, said first member having a transverse opening extending through a portion thereof; and
a second member having a hook and being coupled to said first member and being rotatably mounted to said first member in said transverse opening about an axis, said hook for coupling to a second item whereby the first item couples to the second item by said safety coupler, said second member further including a releasable connection whereby said first member and said second member release when a force having a selected magnitude is applied to one of said first member and said second member generally along said axis thereby uncoupling the first and second items, said second member including an end portion and a base portion, said end portion rotatably coupling said second member to said first member, said releasable connection being between said end portion and said base portion, said end portion including a pin portion and first and second stops, said pin portion being rotatably coupled to said first member in said transverse opening and being axially restrained in said transverse opening by said first and second stops, and one of said end portion and said base portion including a socket, the other of said end portion and said base portion including a pin, said pin releasably journaled in said socket and forming said releasable connection.

13. The safety coupler according to claim 12, wherein said pin of said one of said end portion and said base portion includes a groove, and said socket includes a ridge, said ridge and said groove releasably coupling said pin in said socket.

14. The safety coupler according to claim 13, wherein said groove includes at least one tapered side.

15. A safety coupler comprising:
a first member forming a closed loop for coupling to first item, said first member having a transverse opening extending through a portion thereof; and
a second member having a rod portion, a hook portion, and an end portion comprising a pin portion and a pair of stops, said pin portion extending through said transverse opening and rotatably coupling said rod portion and said hook portion to said first member about an axis, said stops axially restraining said pin portion in said transverse opening, said hook portion for coupling to a second item whereby the first item is coupled to the second item by said safety coupler, said end portion releasing from said rod portion when a force having a selected magnitude is applied to one of said first member and said second member generally along said axis thereby uncoupling the first and second items, said end portion including a socket, said rod portion including a pin, said pin releasably mounted in said socket to thereby releasably couple said end portion to said rod portion.

16. The safety coupler according to claim 15, wherein said pin includes a groove, said socket including a ridge, and said ridge releasably engaging said groove to thereby releasably couple said end portion to said rod portion.

17. The safety coupler according to claim 16, wherein said end portion includes a cup, said cup providing said socket.

18. The safety coupler according to claim 17, wherein said cup is attached to said end portion.

19. The safety coupler according to claim 18, wherein said cup is releasably attached to said end portion.

* * * * *

UNITED STATES PATENT AND TRADEMARK OFFICE
CERTIFICATE OF CORRECTION

PATENT NO. : 6,671,933 B1
DATED : January 6, 2004
INVENTOR(S) : Roxane Friend and James R. Friend It is certified that error appears in the above-identified patent and that said Letters Patent is hereby corrected as shown below:

<u>Column 5,</u>
Line 13, "This" should be -- The --.
Line 51, "alone" should be -- along --.
Line 61, "counting" should be -- coupling --.

Signed and Sealed this

Fifteenth Day of November, 2005

JON W. DUDAS
*Director of the United States Patent and Trademark Office*